(12) United States Patent
Furukawa et al.

(10) Patent No.: US 9,752,512 B2
(45) Date of Patent: Sep. 5, 2017

(54) ACTUATOR CONTROL DEVICE

(71) Applicant: IHI Corporation, Koto-ku (JP)

(72) Inventors: Hiroyuki Furukawa, Tokyo (JP);
Takafumi Imazu, Tokyo (JP)

(73) Assignee: IHI Corporation, Koto-ku (JP)

( * ) Notice: Subject to any disclaimer, the term of this patent is extended or adjusted under 35 U.S.C. 154(b) by 222 days.

(21) Appl. No.: 14/849,126

(22) Filed: Sep. 9, 2015

(65) Prior Publication Data

US 2015/0377147 A1 Dec. 31, 2015

(30) Foreign Application Priority Data

Mar. 14, 2013 (JP) ................. 2013-051635

(51) Int. Cl.
*F15B 11/16* (2006.01)
*F02C 9/20* (2006.01)

(52) U.S. Cl.
CPC ............ *F02C 9/20* (2013.01); *F15B 11/16* (2013.01); *F15B 2211/6336* (2013.01); *F15B 2211/7107* (2013.01); *F15B 2211/76* (2013.01)

(58) Field of Classification Search
CPC .... F02C 9/20; F15B 11/16; F15B 2211/6336; F15B 2211/76
See application file for complete search history.

(56) References Cited

U.S. PATENT DOCUMENTS

| | | | |
|---|---|---|---|
| 5,656,903 A | 8/1997 | Shui et al. | |
| 9,422,813 B2 * | 8/2016 | Bonny | B64C 13/503 |
| 2002/0121086 A1 | 9/2002 | Flavell | |

FOREIGN PATENT DOCUMENTS

| | | |
|---|---|---|
| DE | 103 27 371 A1 | 1/2005 |
| EP | 0 313 899 A2 | 5/1989 |
| EP | 0 313 899 A3 | 5/1989 |
| JP | 62-088802 A | 4/1987 |
| JP | 01-216101 A | 8/1989 |
| JP | 2000-234601 A | 8/2000 |
| JP | 2004-301138 A | 10/2004 |
| JP | 2006-153282 A | 6/2006 |
| JP | 3994208 B2 | 8/2007 |
| JP | 2008-090692 A | 4/2008 |
| JP | 4209037 B2 | 10/2008 |
| JP | 2011-127639 A | 6/2011 |

(Continued)

OTHER PUBLICATIONS

Extended European Search Report issued Oct. 25, 2016 in Patent Application No. 14763234.3.

(Continued)

*Primary Examiner* — Logan Kraft
*Assistant Examiner* — Abiy Teka
(74) *Attorney, Agent, or Firm* — Oblon, McClelland, Maier & Neustadt, L.L.P.

(57) ABSTRACT

An actuator control device detects a displacement of a piston in a first actuator, controls the first actuator by feedback control, measures both of forces generated in first and second actuators, corrects a target position command value for a piston in the second actuator in accordance with an amount of imbalance between the forces, and controls the second actuator in accordance with the difference between the corrected command value and a feedback value of a displacement position of the second piston.

6 Claims, 8 Drawing Sheets

(56) References Cited

FOREIGN PATENT DOCUMENTS

JP         2011127639 A  *  6/2011
WO    WO 2007/141839 A1    12/2007

OTHER PUBLICATIONS

International Search Report mailed May 13, 2014 for PCT/JP2014/055582 filed Mar. 5, 2014 with English Translation.
International Written Opinion mailed May 13, 2014 for PCT/JP2014/055582 filed Mar. 5, 2014.

* cited by examiner

ACTUATOR CONTROL DEVICE

CROSS REFERENCE TO RELATED APPLICATIONS

This application is a continuation application of International Application No. PCT/JP2014/055582, filed on Mar. 5, 2014, which claims priority to Japanese Patent Application No. 2013-051635, filed on Mar. 14, 2013, the entire contents of which are incorporated by references herein.

BACKGROUND

1. Technical Field

The present invention relates to an actuator control device for a dual-control actuator which adjusts the angles of variable stator vanes used in a fan, a compressor, a turbine, or the like of a jet engine.

2. Description of the Related Art

A fan, a compressor, or a turbine of a jet engine is provided with variable stator vanes 101. As shown in FIG. 4, the variable stator vanes 101 are configured such that the angles thereof can be changed in accordance with load status. To change the angles of the variable stator vanes 101, a first (master-side) hydraulic cylinder 104 as a first actuator and a second (slave-side) hydraulic cylinder 105 as a second actuator are used. The first hydraulic cylinder 104 and the second hydraulic cylinder 105 are connected to a link 103 to face each other across a rotation axis 102, and give the link 103 turning forces in the same direction. It should be noted that in FIG. 4, 106 denotes a piston of the hydraulic cylinder 104, and 107 denotes a piston of the hydraulic cylinder 105. One end of a bell crank 108 is connected to a tip of the piston 106, and one end of a bell crank 109 is connected to a tip of the piston 107. Other ends of the bell cranks 108 and 109 are connected to the link 103. The bell cranks 108 and 109 are rotatably supported by fixing members (not shown). Accordingly, when the bell cranks 108 and 109 rotate in conjunction with the ejection and retraction of the pistons 106 and 107, the link 103 rotates about the central axis 102. As a result, the angles of rotation of the variable stator vanes 101 are adjusted. It should be noted that arrows in FIG. 4 indicate the movement of the bell cranks 108 and 109, the link 103, and the variable stator vanes 101 for the case where the pistons 106 and 107 are displaced in directions (directions of extension) in which the pistons 106 and 107 are pushed out.

FIG. 5 shows a modeled link mechanism for the variable stator vanes 101. By modeling, the link 103 is represented as a rod-shaped coaxial synchronous link. In this model, a central portion of the link 103 is pivotally supported about the rotation axis 102, the piston 106 of the first hydraulic cylinder 104 is connected to one end of the link 103, and the piston 107 of the second hydraulic cylinder 105 is connected to other end of the link 103 in an opposite direction. When the pistons 106 and 107 are simultaneously pushed out or pulled back, a forward or reverse turning force is applied to the link 103. It should be noted that arrows in FIG. 5 indicate the movement of the link 103 for the case where the pistons 106 and 107 are displaced in directions (directions of extension) in which the pistons 106 and 107 are pushed out.

FIG. 6 is a block diagram of a conventional actuator control device for controlling the angle of rotation of a modeled synchronous link 2. This conventional actuator control device employs a one-servo valve active-standby configuration. In this configuration, fluid (working fluid) for driving each hydraulic cylinder is simultaneously supplied to or discharged from the hydraulic cylinders 4 and 5 as actuators through a single servo valve 8. Psup denotes supply paths of fluid to the servo valve 8, Pret denotes return paths of fluid, Qh denotes flow paths of fluid to respective piston head chambers Ph of the hydraulic cylinders 4 and 5, and Qr denotes flow paths of fluid to respective piston rod chambers Pr of the hydraulic cylinders 4 and 5. Displacement sensors F_A and F_B are installed in the pistons 6 and 7 of the hydraulic cylinders 4 and 5, and detect the displacement positions of the pistons 6 and 7 to provide feedback. In FIG. 6, the displacement sensor F_A feeds back a detected displacement value XVSVFB_A indicating the displacement position of the piston 6 of the hydraulic cylinder 4 for driving one end (end A) of the synchronous link 2, and the displacement sensor F_B feeds back a detected displacement value XVSVFB_B indicating the displacement position of the piston 7 of the hydraulic cylinder 5 for driving other end (end B) of the synchronous link 2.

Moreover, in the actuator control device of FIG. 6, the single servo valve 8 drives a spool 9 using dual redundant coils T/M_A and T/M_B of a torque motor to perform supply/return operating mode switching and flow rate adjustment. Further, driving currents passed through the dual redundant coils T/M_A and T/M_B of the servo valve 8 are controlled by a control unit 10. A servo valve driver 15 receives a control current command from the control unit 10, and performs control so that a torque motor driving current may be passed through one of the dual redundant coils T/M_A and T/M_B which has received the command. This causes the torque motor to rotate by a predetermined angle and causes the spool 9 of the servo valve 8 to move by a predetermined amount of travel.

The control unit 10 alternately turns on (close) and off (open) current supply switches SW_A and SW_B in order to select a properly operating one of the two systems in the case where a malfunction occurs in one of the two systems, or in order to alternately the activate system A or the system B at every start-up time even when these systems are properly operating. In the following, for convenience of explanation, a description will be made of feedback control operation for the case where system A is active (ATV) and where system B is standby (STB). Control position target values XVSVREF_A and XVSVREF_B (these are generally common values of independent operations) are inputted to plus-signed terminals of subtractors 11 and 12, and the detected displacement values XVSVFB_A and XVSVFB_B of the displacement sensors F_A and F_B are fed back to minus-signed terminals of the subtractors 11 and 12. Further, the subtractors 11 and 12 perform subtractions on these input quantities, and output difference values as controlled variables. PID controllers 13 and 14 perform PID operations on the difference values outputted from the subtractors 11 and 12, and output calculation results as current command values. The gains of the PID controllers 13 and 14 are K.

As shown in FIG. 6, when system A and system B are respectively set to active and standby, and the current supply switch SW_A and the current supply switch SW_B are respectively on and off, the current command value outputted from the PID controller 13 is inputted to the servo valve driver 15, and the servo valve driver 15 passes a current in accordance with the current command value through the dual redundant coil T/M_A of system A to rotate the torque motor. The spool 9 is driven by the rotation of the torque motor to simultaneously supply fluid to the piston head chambers Ph of the two hydraulic cylinders 4 and 5 and simultaneously collect fluid from the piston rod chambers Pr thereof, or to simultaneously supply fluid to the piston rod chambers Pr of the two hydraulic cylinders 4 and 5 and simultaneously collect fluid from the piston head chambers Ph thereof. Ideally, this causes the pistons 6 and 7 of the two hydraulic cylinders 4 and 5 to be pushed out or pulled back by the same amount of displacement, and this produces driving forces which rotate the synchronous link 2 in a forward direction (counterclockwise direction in FIG. 6) or in a reverse direction (clockwise direction in FIG. 6) by a predetermined angle. This is the feedback control of the synchronous link by a conventional actuator control device employing a one-servo valve active-standby configuration.

Moreover, a conventional actuator control device employing a one-servo valve active-active configuration has also been known. The configuration thereof is shown in FIG. 7. In the actuator control device of FIG. 7, components identical with or similar to those of the conventional actuator control device shown in FIG. 6 are denoted by the same or like reference signs.

In the conventional actuator control device shown in FIG. 7, in the control unit 10, the current supply switches SW_A and SW_B of system A and system B are simultaneously turned on and made active, and a control current is simultaneously passed through the dual redundant coils T/M_A and T/M_B of the torque motor in accordance with results of feedback PID control operations of the PID controllers 13 and 14 to control the servo valve 8. In this configuration, both of outputs of the PID controllers 13 and 14 are valid (both are used). Accordingly, the gains of the PID controllers 13 and 14 are set to K/2 in order to obtain the same control performance as that of the configuration of FIG. 6.

These conventional actuator control devices perform the operation of simultaneously supplying or collecting fluid to/from the piston head chambers Ph and the piston rod chambers Pr through the single servo valve 8 and the flow paths Qh and Qr. It is impossible to perform control so that the pistons 6 and 7 of the hydraulic cylinders 4 and 5 may be moved strictly at the same time by the same distance while generating the same force, due to the individual difference between the hydraulic cylinders 4 and 5, the difference in length between the flow paths Qh and Qr from the single servo valve 8 to the hydraulic cylinders 4 and 5, the individual difference between the flow paths themselves, friction, rattle, and the like of components including the synchronous link 2 and junctions. Accordingly, turning forces acting on two opposite ends of the synchronous link 2 do not strictly match, and may create an imbalance. In that case, there has been a problem that so-called force fighting occurs which applies an excessive force to the synchronous link 2.

As an actuator control device which solves this, an actuator control device employing a two-servo valve active-active configuration such as shown in FIG. 8 has also been known. It should be noted that in the actuator control device of FIG. 8, components identical with or similar to those of the conventional actuator control devices shown in FIGS. 6 and 7 are denoted by the same or like reference signs.

In this configuration shown in FIG. 8, two servo valves 81 and 82 individually drive the two hydraulic cylinders 4 and 5, and turning forces are respectively applied to two opposite ends of the synchronous link 2. These turning forces are simultaneously and individually adjusted in system A and system B by feedback control. Here, positions of the servo valves 81 and 82 are backed up by interchannel communications. Moreover, feedback control in each of system A and system B employs an active-standby configuration. Specifically, when a malfunction occurs in each system, the actuator control device selects a properly operating switch from the current supply switches SW_A1 and SW_A2 of system A, and selects a properly operating switch from the current supply switches SW_B1 and SW_B2 of system B. Moreover, even in a normal case, the actuator control device alternately turns on and off the current supply switches SW_A1 and SW_A2 of system A and alternately turns on and off the current supply switches SW_B1 and SW_B2 of system B at every start-up time. It should be noted that the gains of the PID controllers 13A and 14A of system A and the PID controllers 13B and 14B of system B are K/2.

In the case of the conventional example of this type, feedback loops for the servo valves 81 and 82 can be formed individually for system A and system B. Accordingly, the lengths of fluid flow paths in system A and system B can be made equal. However, it is difficult to activate both of the systems strictly at the same time, and there has been a problem that force fighting caused by turning forces applied to end A and end B of the synchronous link 2 is not sufficiently eliminated.

SUMMARY OF THE INVENTION

An object of the present invention is to provide an actuator control device which performs the feedback control of the angle of rotation of a synchronous link using two servo valves, which reduces force fighting caused by first and second actuators, and which can accurately control the angle of rotation of the synchronous link.

An aspect of the present invention is an actuator control device for controlling first and second actuators comprising first and second pistons respectively connected to points of application of forces on a coaxial synchronous link, the points of application being located on opposite sides of a center of rotation of the coaxial synchronous link, the actuator control device comprising: a first servo valve for driving ejection and retraction of the first piston; a second servo valve for driving ejection and retraction of the second piston independently of the first servo valve; displacement sensors for detecting displacement positions of the first and second pistons, respectively; force sensors for measuring forces generated in the first and second actuators, respectively; and a control unit for controlling the first and second servo valves, the control unit configured to: detect the displacement position of the first piston, control the first servo valve by feedback control so that a position of the first piston matches a target position command value, measure both of forces generated in the first and second actuators, correct a target position command value for the second piston in accordance with an amount of imbalance between the forces; and control the second servo valve in accordance with a difference between the corrected command value and a feedback value of the displacement position of the second piston so that a position of the second piston matches the corrected command value.

The control unit may be configured to measure both of forces generated in the first and second actuators by use of a feedback value of the displacement position of the first piston instead of the target position command value for the second actuator as a target position command value, correct the target position command value for the piston of the second actuator in accordance with an amount of imbalance between the forces, and control the second servo valve in accordance with a difference between the corrected command value and a feedback value of the displacement position of the piston of the second actuator so that the position of the piston of the second actuator matches the corrected command value.

In the actuator control device of the present invention, for the first actuator, the displacement of the piston is detected, and the first actuator is controlled by feedback control. For the second actuator, both of forces generated in the first and second actuators are measured, a target position command value is corrected in accordance with an amount of imbalance between the forces, and the second actuator is controlled in accordance with the difference between the corrected command value and a feedback value of the displacement position of the second actuator. Accordingly, force fighting can be avoided, and the angle of rotation of the synchronous link can be accurately controlled.

Moreover, in the control of the second actuator, by using a feedback value of the displacement position of the first actuator as a target position command value, correcting the command value in accordance with the amount of imbalance between forces generated in the first and second actuators, and controlling the second actuator in accordance with the difference between the corrected command value and the feedback value of the displacement position of the second actuator, force fighting can be avoided, and the angle of rotation of the synchronous link can be accurately controlled.

DESCRIPTION OF THE EMBODIMENTS

Hereinafter, embodiments of the present invention will be described in detail with reference to drawings.

First Embodiment

An actuator control device of a first embodiment shown in FIG. 1 will be described. The actuator control device of the present embodiment employs two-servo valve active-active control. The actuator control device includes servo valves 81 and 82 for individually driving hydraulic cylinders 4 and 5 as actuators, and adjusts turning forces applied to two ends of a synchronous link 2 by feedback control simultaneously and individually in system A and system B. Moreover, with regard to the feedback control in each of system A and system B, the actuator control device employs an active-standby configuration. Accordingly, in the case where a malfunction occurs in system A, the actuator control device selects a properly operating switch between current supply switches SW_A1 and SW_A2 of system A. Alternatively, in the case where a malfunction occurs in system B, the actuator control device selects a properly operating switch between the current supply switches SW_B1 and SW_B2 of system B. Moreover, even in the case where no malfunction occurs, the actuator control device alternately turns on and off the current supply switches SW_A1 and SW_A2 and alternately turns on and off the current supply switches SW_B1 and SW_B2 in system A and system B at every start-up time. The gains of PID controllers 13A and 14A of system A and PID controllers 13B and 14B of system B are K/2. It should be noted that in FIG. 1, components identical with or similar to those of the actuator control device of FIG. 8 are denoted by the same or like reference signs.

Figure 8:
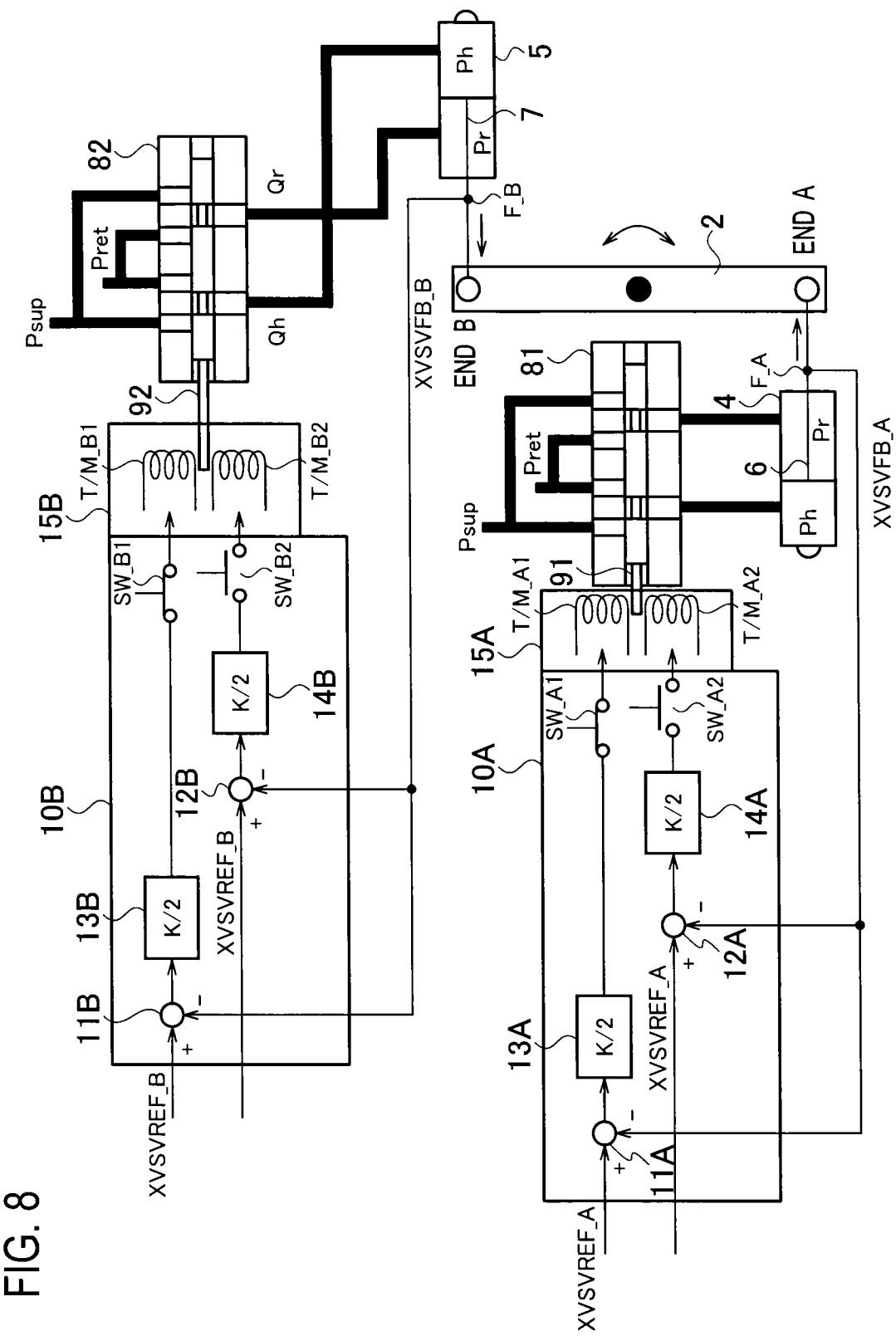
FIG. 8 is a control block diagram of a conventional actuator control device employing a two-servo valve active-active configuration.

The feedback control of system B in the present embodiment is the same as that of the conventional example shown in FIG. 8. Meanwhile, in system A in the present embodiment, a control command value is corrected in accordance with the amount of imbalance between forces of the hydraulic cylinders 4 and 5, and feedback control is performed using the corrected control command value as in system B. Accordingly, in the present embodiment, the hydraulic cylinder 5 of system B corresponds to a first actuator, and the hydraulic cylinder 4 of system A corresponds to a second actuator.

In the actuator control device of the present embodiment, in order to calculate a correction value in accordance with the amount of force imbalance in system A, a pressure sensor 21A is installed in a piston head chamber Ph of the hydraulic cylinder 4, and a pressure sensor 22A is installed in a piston rod chamber Pr thereof. Moreover, a pressure sensor 21B is installed in a piston head chamber Ph of the hydraulic cylinder 5, and a pressure sensor 22B is installed in a piston rod chamber Pr thereof. It should be noted that a pressure sensor may be a differential pressure sensor for measuring the difference between the piston head chamber Ph and the piston rod chamber Pr of each hydraulic piston cylinder.

The actuator control device of the present embodiment includes force calculators 23 and 24. The force calculator 23 calculates a force (Pha*Ah−Pra*Ar) acting on a piston head of the hydraulic cylinder 4 of system A. The force calculator 24 calculates a force (Phb*Ah−Prb*Ar) acting on a piston head of the hydraulic cylinder 5 of system B. A subtractor 25 receives calculation results from the force calculators 23 and 24, and subtracts the force of system B from the force of system A to output the amount of force imbalance ΔFP. The amount of force imbalance ΔFP is attenuated by an attenuator 26, integrated with respect to time by an integrator 27 to be converted to a unit of distance, and then fed back to minus-signed terminals of subtractors 28 and 29 newly disposed in a feedback loop of system A as a correction value ΔFt of the amount of force imbalance. Each of the plus-signed terminals of the subtractors 28 and 29 receives a control position target value XVSVREF_A for a servo valve 81. Accordingly, outputs of the subtractors 28 and 29 are values calculated from (control position target value XVSVREF_A−correction quantity ΔFt), and are passed to plus-signed terminals of feedback subtractors 11A and 12A of system. A. Detected displacement values XVSVFB_A and XVSVFB_B indicating piston displacement positions detected by displacement sensors F_A and F_B are fed back to minus-signed terminals of the subtractors 11A and 12A of system A and minus-signed terminals of subtractors 11B and 12B of system B.

Next, an operation for controlling the servo valves 81 and 82 and an operation for controlling the angle of rotation of the synchronous link 2 by the actuator control device having the above-described configuration will be described. In this description, the following is assumed: at the time of start-up, in system A, the current supply switch SW_A1 is on, and the current supply switch SW_A2 is off; and, in system B, the current supply switch SW_B1 is on, and the current supply switch SW_B2 is off. It should be noted that at the time of next start-up, the on and off of the switches are inversed. Moreover, this feedback control loop is repeated with a predetermined short period on the order of μsec or msec. Accordingly, time integration by the integrator 27 is equal to this control period.

Figure 1:
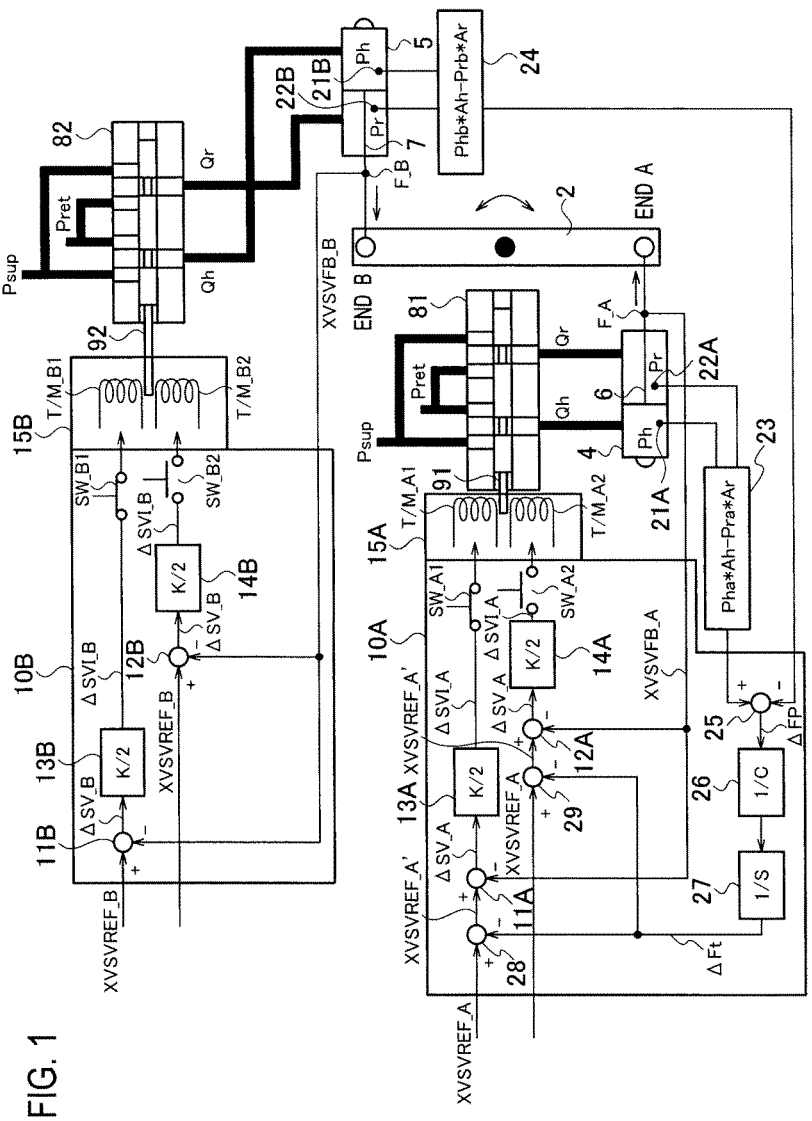
FIG. 1 is a control block diagram of an actuator control device of a first embodiment of the present invention.

In the state shown in FIG. 1, control position target values XVSVREF_A and XVSVREF_B are externally inputted to system A and system B, respectively.

First, control in system B will be described. System B controls the hydraulic cylinder 5 as a first actuator. The displacement sensor F_B detects the position displacement of the piston (first piston) of the hydraulic cylinder 5, and outputs a detected displacement value XVSVFB_B to provide feedback to the subtractors 11B and 12B of a control unit 10B. The subtractors 11B and 12B subtract the detected displacement value XVSVFB_B as a feedback value from the control position target value XVSVREF_B, and input the difference value ΔSV_B to the PID controllers 13B and 14B. The PID controllers 13B and 14B perform PID control operations on the inputted difference value ΔSV_B, and output a current manipulated variable ΔSVI_B. Since the current supply switch SW_B1 of the current supply switches SW_B1 and SW_B2 is on, the current manipulated variable ΔSVI_B is inputted to the servo valve driver 15B through the current supply switch SW_B1 hereafter.

Upon receiving the current manipulated variable, the servo valve driver 15B passes a current of the current manipulated variable ΔSVI_B through the dual redundant coils T/M_B1 to rotate a torque motor in a predetermined direction in accordance with the current by a predetermined angle. This causes a spool 92 to move by a predetermined amount, causes fluid to be supplied to the piston head chamber Ph of the hydraulic cylinder 5 by a predetermined amount in accordance with the amount of travel of the spool 92 or causes fluid to be supplied to the piston rod chamber Pr by a predetermined amount in accordance with the amount of travel of the spool 92, and causes the piston 7 in a forward or reverse direction by a required amount. In other words, control is performed so that the position of the piston 7 may match the control position target value (target position command value) XVSVREF_B. Further, this control is repeated with a control period. This control causes one end (end B) of the synchronous link 2 connected to the piston 7 to be pushed out or pulled back and rotate to a predetermined angle.

Next, control in system A will be described. System A controls the hydraulic cylinder 4 as a second actuator. In system A, position-based force correction control is performed. The pressure sensor 21A detects the pressure in the piston head chamber Ph of the hydraulic cylinder 4, and outputs the detected pressure value Pha to the force calculator 23. The pressure sensor 22A detects the pressure in the piston rod chamber Pr, and outputs the detected pressure value Pra to the force calculator 23. The force calculator 23 calculates the pressure difference between the piston head chamber Ph and the piston rod chamber Pr, and outputs the pressure difference to the plus-signed terminal of the subtractor 25. The pressure difference is obtained from the expression (Pha*Ah−Pra*Ar), where Ah is the cross-sectional area of the piston head chamber Ph, and Ar is the cross-sectional area of the piston rod chamber Pr.

In system B, again, the pressure difference between the piston head chamber Ph and the piston rod chamber Pr is obtained as in system A. The pressure sensor 21B detects the pressure in the piston head chamber Ph of the hydraulic cylinder 5, and outputs the detected pressure value Phb to the force calculator 24. The pressure sensor 22B detects the pressure in the piston rod chamber Pr, and outputs the detected pressure value Prb to the force calculator 24. The force calculator 24 calculates the pressure difference between the piston head chamber Ph and the piston rod chamber Pr, and outputs the pressure difference to a minus-signed terminal of the subtractor 25. The pressure difference is obtained from the expression (Phb*Ah−Prb*Ar), where Ah is the cross-sectional area of the piston head chamber Ph, and Ar is the cross-sectional area of the piston rod chamber Pr. It should be noted that since the two hydraulic cylinders 4 and 5 are built to the same specifications, the cross-sectional areas Ah and Ar have the same value.

The piston head of the piston 6 in the hydraulic cylinder 4 is subject to a force. Similarly, the piston head of the piston 7 in the hydraulic cylinder 5 is subject to a force. The subtractor 25 of a control unit 10A calculates and outputs the amount of imbalance ΔFP as a deviation of these forces. The attenuator 26 attenuates the amount of imbalance ΔFP. Then, the integrator 27 integrates the amount of imbalance ΔFP attenuated by the attenuator 26 with respect to time, and outputs a correction value ΔFt. The time integration by the integrator 27 is performed for conversion to a unit of distance by force×time. The correction value ΔFt outputted from the integrator 27 is inputted to the minus-signed terminals of the subtractors 28 and 29.

The subtractors 28 and 29 subtract the correction value ΔFt of the amount of force imbalance ΔFP from the control position target value (target position command value) XVSVREF_A, and output the corrected control position target value (corrected target position command value) XVSVREF_A' obtained by the subtraction to the subtractors 11A and 12A. Similar to the feedback control in system B, the subtractors 11A and 12A subtract a detected displacement value XVSVFB_A of the displacement sensor F_A as a feedback value from the corrected control position target value XVSVREF_A', and input the difference value ΔSV_A obtained by the subtraction to the PID controllers 13A and 14A. The PID controllers 13A and 14A perform PID control operations on the inputted difference value ΔSV_A, and output the current manipulated variable ΔSVI_A. In this case, again, since SW_A1 of the current supply switches SW_A1 and SW_A2 is on, the current manipulated variable ΔSVI_A is inputted to the servo valve driver 15A through the current supply switch SW_A1.

Upon receiving the current manipulated variable ΔSVI_A, the servo valve driver 15A passes a current corresponding to the current manipulated variable ΔSVI_A through the dual redundant coil T/M_A1 to rotate a torque motor in a forward or reverse direction by a predetermined angle. This causes a spool 91 to move by a predetermined amount, causes fluid to be supplied to the piston head chamber Ph or the piston rod chamber Pr of the hydraulic cylinder 4 by a predetermined amount in accordance with the amount of travel of the spool 91, and causes the piston 6 to move in a forward or reverse direction by a required amount. In other words, control is performed so that the position of the piston 6 may match the control position target value XVSVREF_A' corrected with the amount of force imbalance ΔFP. Further, this control is repeated with a control period. This control causes other end (end A) of the synchronous link 2 connected to the piston 6 to be pushed out or pulled back and rotate to a predetermined angle.

In the case of the present embodiment, imbalance between pushing or pulling forces of the pistons 6 and 7 in the hydraulic cylinders 4 and 5 is absorbed in advance by feedback control in system A. Accordingly, though the hydraulic cylinders 4 and 5 are individually controlled in system A and system B, force imbalance between the two is not created. As a result, forces acting on two opposite ends of the synchronous link 2 match, and the angle of rotation of the synchronous link 2 can be controlled in a state in which force fighting does not occur.

Figure 7:
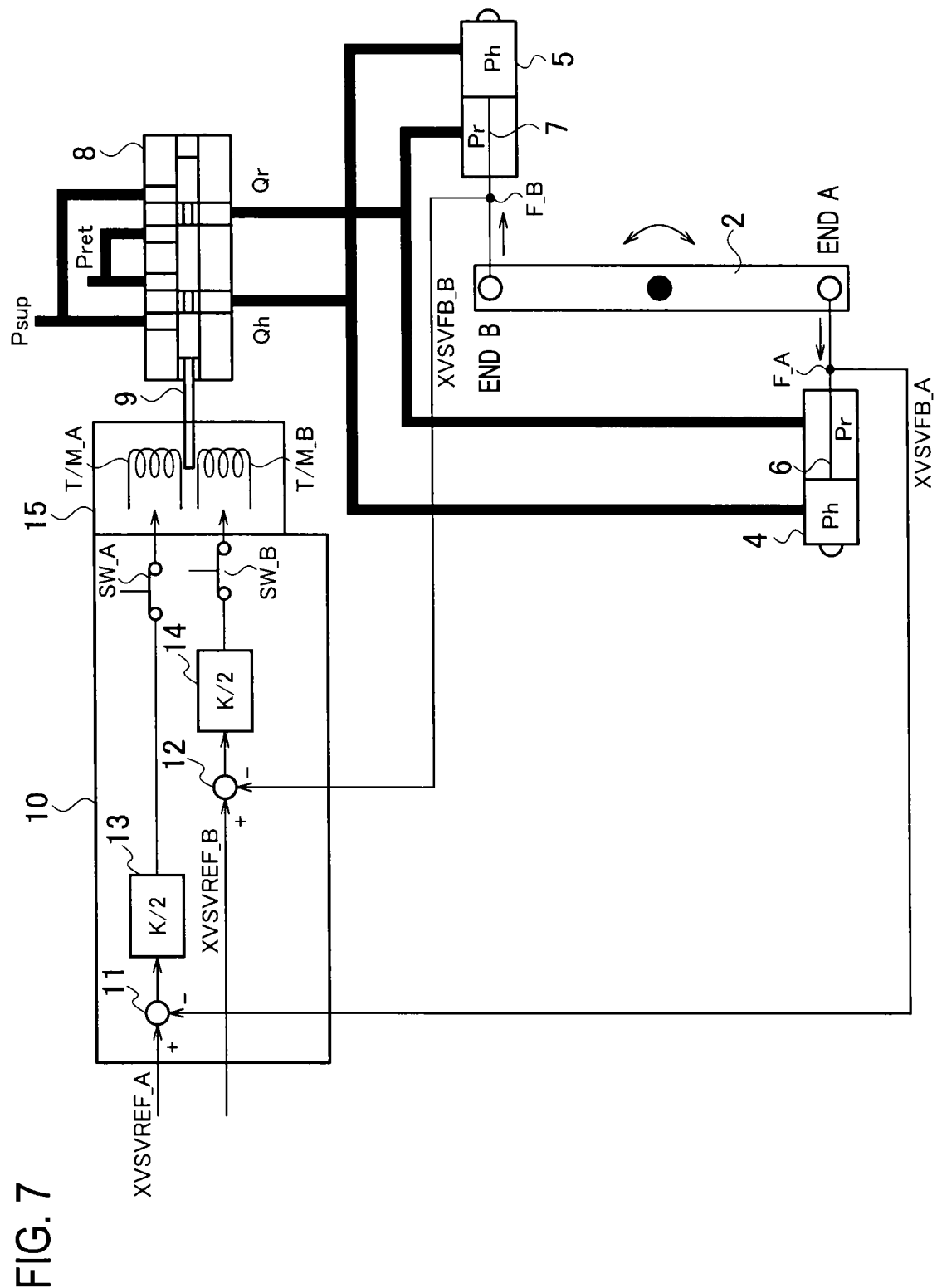
FIG. 7 is a control block diagram of a conventional actuator control device employing a one-servo valve active-active configuration.

It should be noted that the actuator control device according to this first embodiment employs an active-standby configuration in which the current supply switches SW_A1 and SW_A2 of system A and the current supply switches SW_B1 and SW_B2 of system B are alternately turned on/off (switch to be used is switched) every time a malfunction in one system (system including a current supply switch) or start-up occurs. However, the actuator control device may also employ an active-active configuration instead of the foregoing configuration in each of system A and system B as shown in FIG. 7. In that case, the gains of the PID controllers 13A, 13B, 14A, and 14B are set to K/4. Further, instead of the P control of the PID controllers 13A, 13B, 14A, and 14B, PI control with high control performance may also be employed. Moreover, a force correction controller including the attenuator 26 and the integrator 27 may also employ P control with fast responsiveness instead of I control.

Second Embodiment

Figure 2:
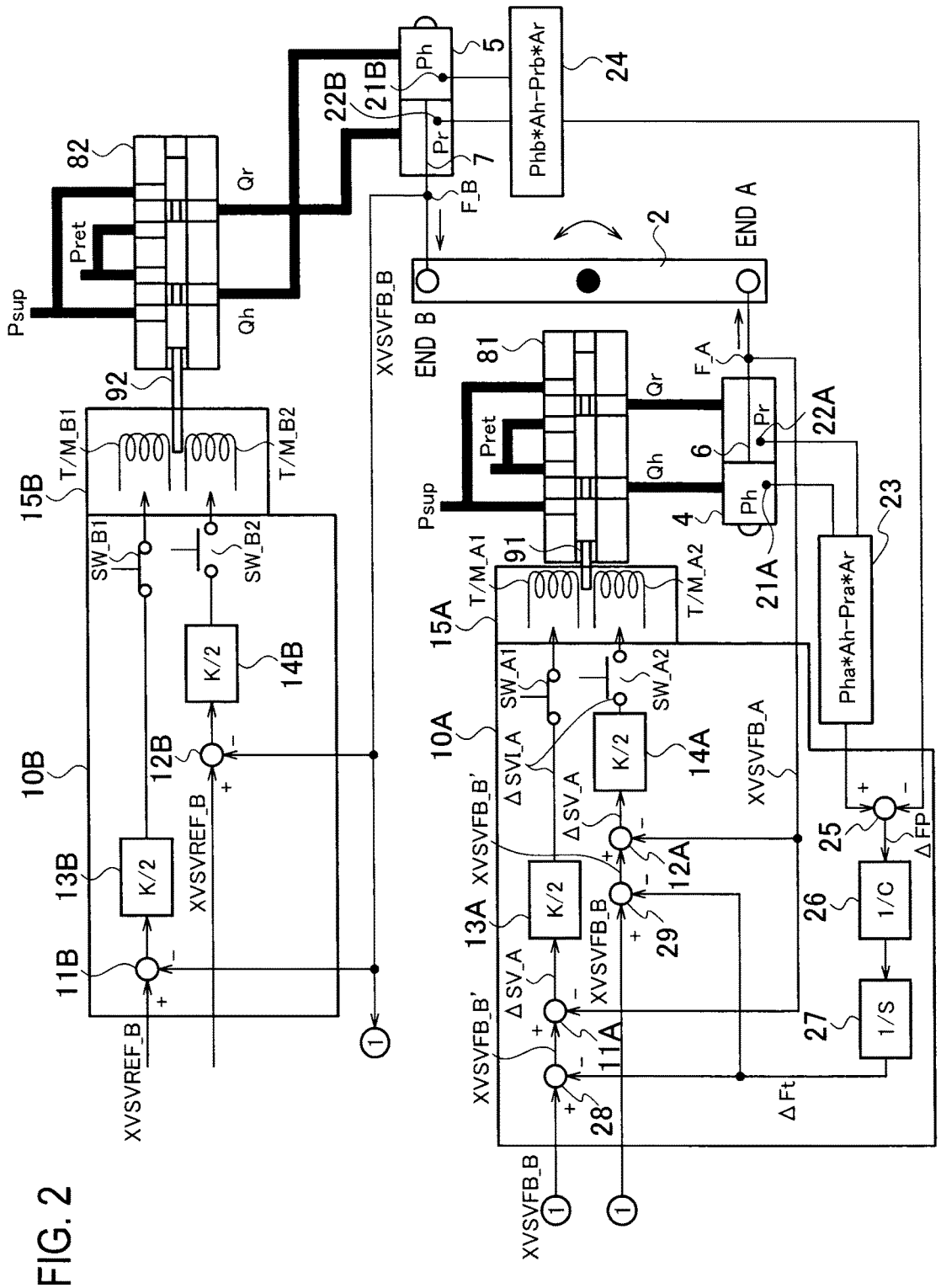
FIG. 2 is a control block diagram of an actuator control device of a second embodiment of the present invention.

FIG. 2 shows an actuator control device of a second embodiment. In the first embodiment shown in FIG. 1, values given to the plus-signed terminals of the subtractors 28 and 29 are the control position target value XVSVREF_A externally supplied as a control command value for system A for controlling the hydraulic cylinder 4 corresponding to a second actuator. In the second embodiment, instead of the control position target value XVSVREF_A, the detected displacement value XVSVFB_B of the displacement sensor F_B of system B for controlling the hydraulic cylinder 5 corresponding to a first actuator is given to the plus-signed terminals of the subtractors 28 and 29. Except for the above, the configuration of the second embodiment is the same as that of the first embodiment.

The actuator control device of the present embodiment operates as follows. This explanation assumes a situation in which a malfunction occurs in one system of system A and system B or a situation in which the actuator control device is started up. Specifically, the following is assumed: in system A, the current supply switch SW_A1 is on, and the current supply switch SW_A2 is off; and, in system B, the current supply switch SW_B1 is on, and the current supply switch SW_B2 is off.

In the state shown in FIG. 2, in system B, the control position target value XVSVREF_B is externally inputted to the plus-signed terminals of the subtractors 11B and 12B. In system A, the detected displacement value XVSVFB_B of the displacement sensor F_B, which is a feedback value from system B, is inputted to the plus-signed terminals of the subtractors 28 and 29 as a control position target value.

Control in system B is similar to the feedback control in system B of the first embodiment shown in FIG. 1. This control causes one end (end B) of the synchronous link 2 connected to the piston 7 to be pushed out or pulled back and rotate to a predetermined angle.

In system A, position-based force correction control is performed on the feedback value from system B. A correction value ΔFt for force imbalance inputted to the minus-signed terminals of the subtractors 28 and 29 is calculated as in the first embodiment.

The subtractors 28 and 29 subtract the correction value ΔFt for the amount of force imbalance from the detected displacement value XVSVFB_B, and output the corrected detected displacement value XVSVFB_B' to the subtractors 11A and 12A. Similar to the feedback control in system B, these subtractors 11A and 12A subtract the detected displacement value XVSVFB_A of the displacement sensor F_A as a feedback value from the corrected detected displacement value XVSVFB_B', and input the difference value ΔSV_A to the PID controllers 13A and 14A. The PID controllers 13A and 14A perform PID control operations based on the inputted difference value ΔSV_A, and output a current manipulated variable ΔSVI_A. Since SW_A1 of the current supply switches SW_A1 and SW_A2 is on, the current manipulated variable ΔSVI_A is inputted to the servo valve driver 15A through the current supply switch SW_A1.

Upon receiving the current manipulated variable ΔSVI_A, the servo valve driver 15A passes a current of the current manipulated variable 4 SVI_A through the dual redundant coils T/M_A1 to rotate a torque motor in a forward or reverse direction by a predetermined angle. This causes the spool 91 to move by a predetermined amount, causes fluid to be supplied to the piston head chamber Ph or the piston rod chamber Pr of the hydraulic cylinder 4 by a predetermined amount in accordance with the amount of travel of the spool 91, and causes the piston 6 to move in a forward or reverse direction by a required amount. In other words, control is performed so that the position of the piston 6 may match the control position target value XVSVREF_A' corrected with the amount of force imbalance ΔFP. Further, this control is repeated with a control period. This control causes other end (end A) of the synchronous link 2 connected to the piston 6 to be pushed out or pulled back and rotate to a predetermined angle.

In the present embodiment, imbalance between pushing or pulling forces of the pistons 6 and 7 in the hydraulic cylinders 4 and 5 is absorbed in advance by feedback control in system A as in the first embodiment. Accordingly, though the hydraulic cylinders 4 and 5 are individually controlled in system A and system B, force imbalance between the two is not created. As a result, forces acting on two opposite ends of the synchronous link 2 match, and the angle of rotation of the synchronous link 2 can be controlled in a state in which force fighting does not occur. Moreover, since the detected displacement value XVSVFB_B of system B is used as a control target value of system A, the amount of force imbalance can be corrected, and feedback control can be performed based on the difference between feedback values of system A and system B. As a result, compared to the first embodiment, forces acting on two opposite ends of the synchronous link 2 and the amounts of travel thereof can be matched better, and force fighting can be more effectively reduced.

It should be noted that the actuator control device according to this second embodiment employs an active-standby configuration in which the current supply switches SW_A1 and SW_A2 of system A and the current supply switches SW_B1 and SW_B2 of system B are alternately turned on/off at every start-up time (switch to be used is switched), but may be employ an active-active configuration in each of system A and system B as shown in FIG. 7 instead. In that case, the gains of the PID controllers 13A, 13B, 14A, and 14B are set to K/4. Further, instead of the P control of the PID controllers 13A, 13B, 14A, and 14B, PI control with high control performance may also be employed. Moreover, a force correction controller including the attenuator 26 and the integrator 27 may also employ P control with fast responsiveness instead of I control.

Figure 3A:
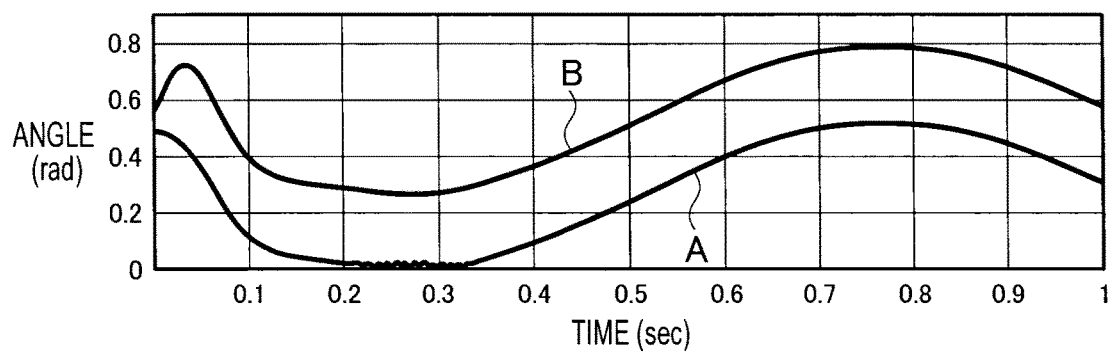
FIG. 3A is a graph showing control characteristics of an actuator control device of a conventional example.
Figure 3B:
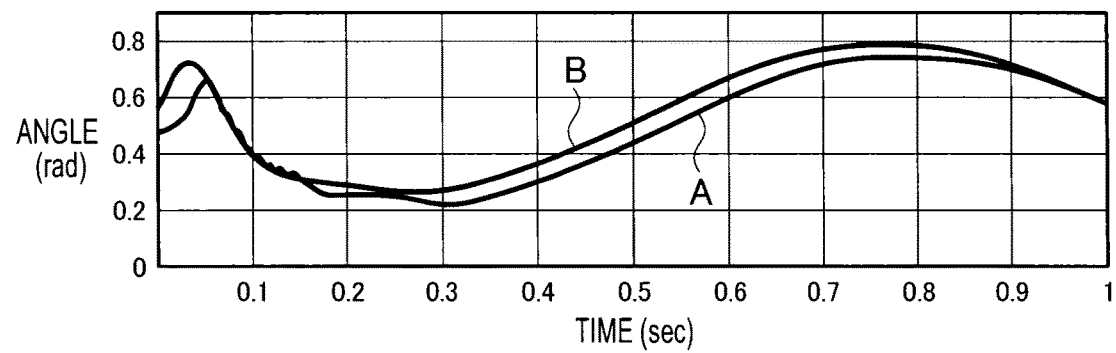
FIG. 3B is a graph showing control characteristics of the actuator control device of the above-described second embodiment.
Figure 4:
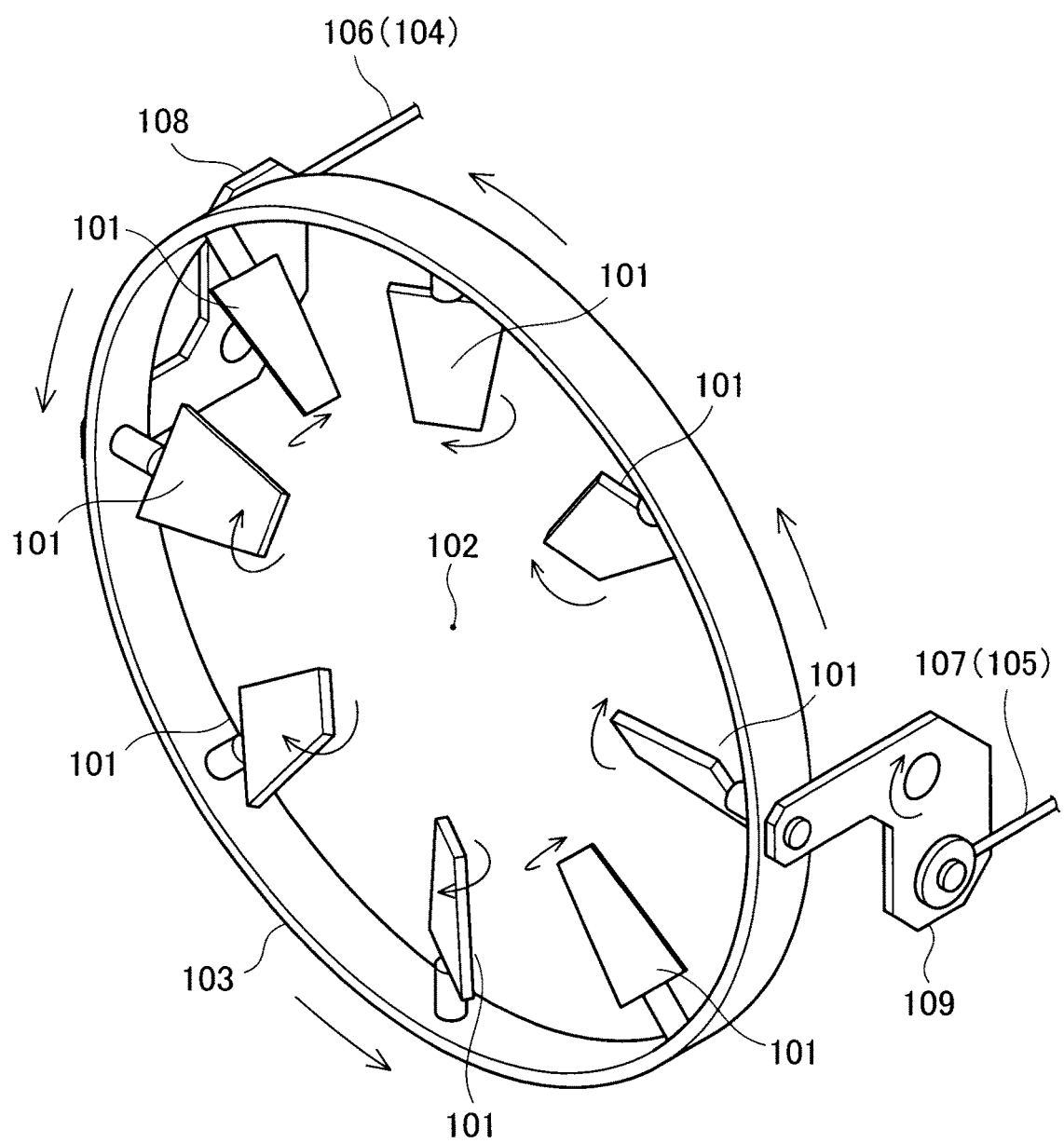
FIG. 4 is a view for explaining a mechanism for driving variable stator vanes of a fan of a jet engine.
Figure 5:
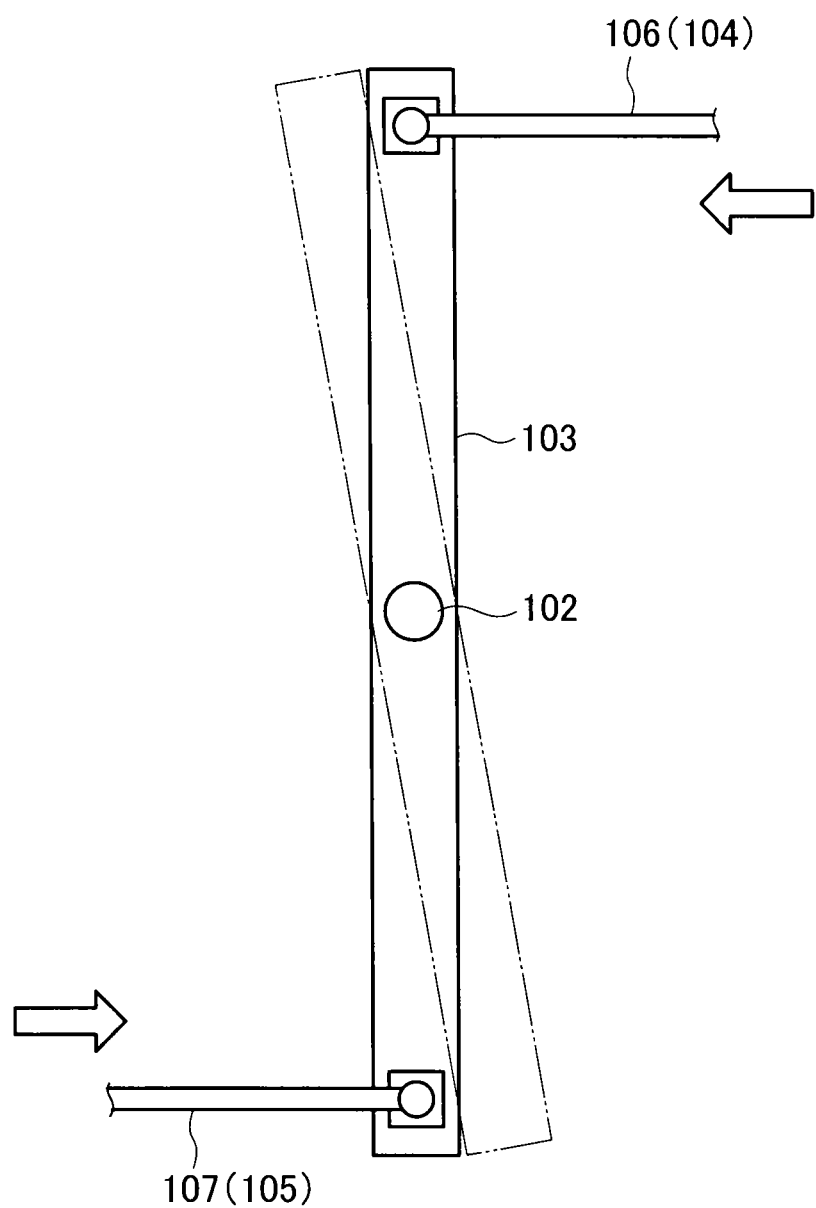
FIG. 5 is an explanatory diagram of a modeled mechanism for driving the above-described variable stator vanes.
Figure 6:
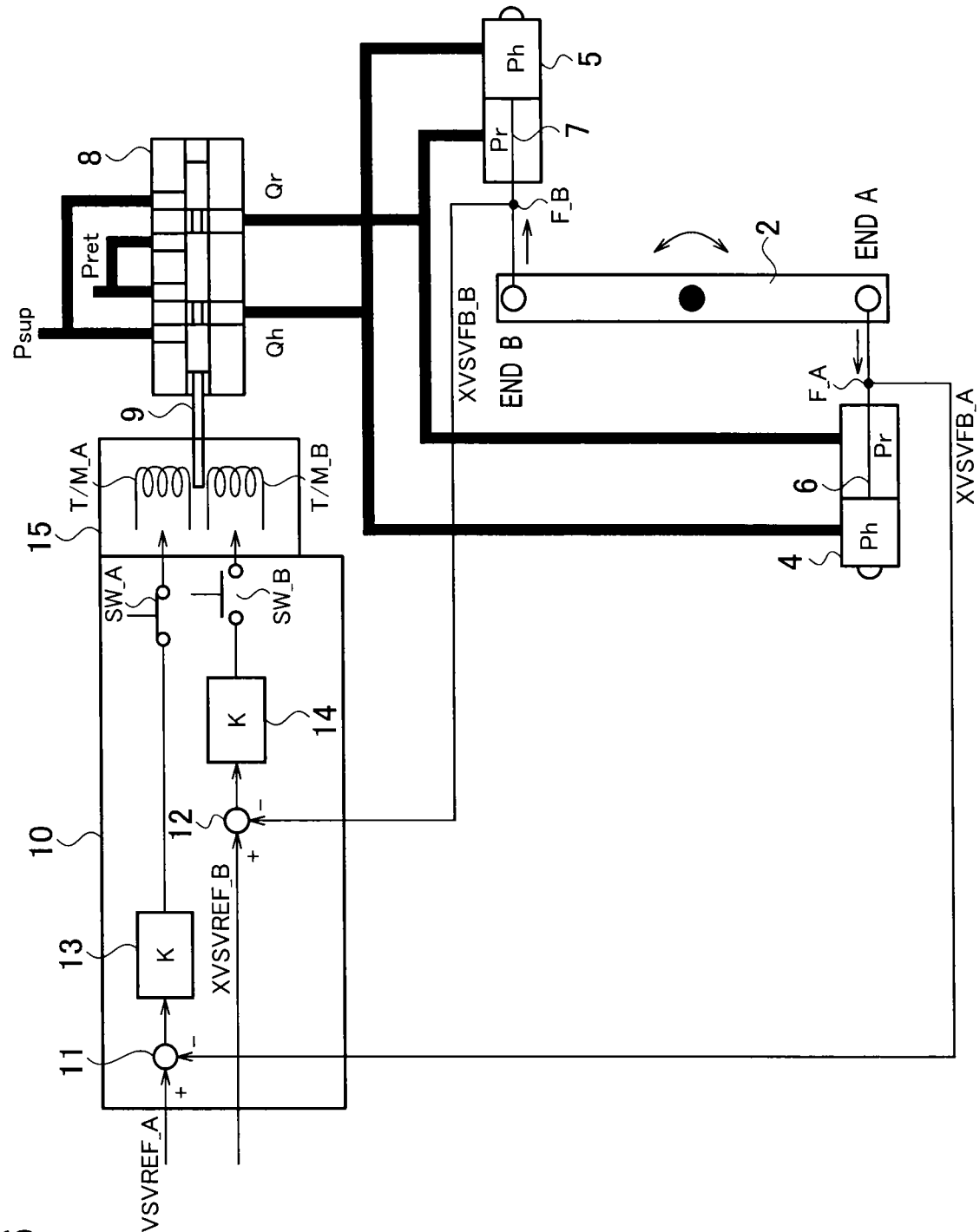
FIG. 6 is a control block diagram of a conventional actuator control device employing a one-servo valve active-standby configuration.

FIG. 3A shows response characteristics of a conventional actuator control device employing a two-servo valve active-active configuration shown in FIG. 8. Moreover, FIG. 3B shows response characteristics of an actuator control device employing two-servo valve active-active position-based force control of the second embodiment shown in FIG. 2. In both of the graphs, curve A represents the angle of rotation of the synchronous link 2 in system A, curve B represents the angle of rotation of the synchronous link 2 in system B, and the overlap between the two curves indicates that the positions of the two actuators coincide. In the case of the conventional example, since there is a difference between the angles of rotation in system A and system B, a deflection occurs in the synchronous link 2. Meanwhile, in the case of the present embodiment, angles by which system A and system B attempt to perform rotation approximately match. Accordingly, forces acting from the hydraulic cylinders 4 and 5 on the synchronous link 2 are similar, and it can be understood that there occurs little force fighting.

It should be noted that the present invention is not limited to the above-described embodiments, but can be changed or modified without departing from the technical scope of the invention defined by the appended claims. For example, a strain gauge may be provided in an actuator as a force sensor.

What is claimed is:

1. An actuator control device for controlling first and second actuators comprising first and second pistons respectively connected to points of application of forces on a coaxial synchronous link, the points of application being located on opposite sides of a center of rotation of the coaxial synchronous link, the actuator control device comprising:
    a first servo valve for driving ejection and retraction of the first piston;
    a second servo valve for driving ejection and retraction of the second piston independently of the first servo valve;
    displacement sensors for detecting displacement positions of the first and second pistons, respectively;
    force sensors for measuring forces generated in the first and second actuators, respectively; and
    a control unit for controlling the first and second servo valves, the control unit configured to:
    detect the displacement position of the first piston,
    control the first servo valve by feedback control so that a position of the first piston matches a target position command value,
    measure both of forces generated in the first and second actuators,
    correct a target position command value for the second piston in accordance with an amount of imbalance between the forces, and
    control the second servo valve in accordance with a difference between the corrected command value and a feedback value of the displacement position of the second piston so that a position of the second piston matches the corrected command value.

2. The actuator control device according to claim 1, wherein the control unit is configured to:
    measure both of forces generated in the first and second actuators by use of a feedback value of the displacement position of the first piston instead of the target position command value for the second actuator as a target position command value,
    correct the target position command value for the piston of the second actuator in accordance with an amount of imbalance between the forces, and
    control the second servo valve in accordance with a difference between the corrected command value and a feedback value of the displacement position of the piston of the second actuator so that the position of the piston of the second actuator matches the corrected command value.

3. The actuator control device according to claim 2, wherein the control unit is further configured to:
    control each of the first actuator and the second actuator by employing an active-standby configuration, and
    alternately activate systems every time any one of start-up and a malfunction in one of the systems occurs.

4. The actuator control device according to claim 2, wherein the control unit is further configured to:
    control each of the first actuator and the second actuator by employing an active-active configuration, and
    alternately activate systems every time any one of start-up and a malfunction in one of the systems occurs.

5. The actuator control device according to claim 1, wherein the control unit is further configured to:
    control each of the first actuator and the second actuator by employing an active-standby configuration, and
    alternately activate systems every time any one of start-up and a malfunction in one of the systems occurs.

6. The actuator control device according to claim 1, wherein the control unit is further configured to:
    control each of the first actuator and the second actuator by employing an active-active configuration, and
    alternately activate systems every time any one of start-up and a malfunction in one of the systems occurs.

* * * * *

UNITED STATES PATENT AND TRADEMARK OFFICE
CERTIFICATE OF CORRECTION

| | | |
|---|---|---|
| PATENT NO. | : 9,752,512 B2 | Page 1 of 1 |
| APPLICATION NO. | : 14/849126 | |
| DATED | : September 5, 2017 | |
| INVENTOR(S) | : Hiroyuki Furukawa et al. | |

It is certified that error appears in the above-identified patent and that said Letters Patent is hereby corrected as shown below:

On the Title Page

Item (63), the Related U.S. Application Data has been omitted. Item (63) should read:
-- Related U.S. Application Data
(63) Continuation of application No. PCT/JP2014/055582, filed on Mar. 5, 2014. --

Signed and Sealed this
First Day of May, 2018

Andrei Iancu
*Director of the United States Patent and Trademark Office*